United States Patent [19]
Suzuki et al.

[11] Patent Number: 5,539,468
[45] Date of Patent: Jul. 23, 1996

[54] CODING DEVICE AND DECODING DEVICE ADAPTIVE TO LOCAL CHARACTERISTICS OF AN IMAGE SIGNAL

[75] Inventors: Kazuhiro Suzuki, Kanagawa; Ken Umezawa, Saitama; Koh Kamizawa, Kanagawa, all of Japan

[73] Assignee: Fuji Xerox Co., Ltd., Tokyo, Japan

[21] Appl. No.: 370,816

[22] Filed: Jan. 10, 1995

Related U.S. Application Data

[63] Continuation of Ser. No. 59,533, May 12, 1993, abandoned.

[30] Foreign Application Priority Data

May 14, 1992 [JP] Japan .................................. 4-122075

[51] Int. Cl.⁶ ...................................................... H04N 7/30
[52] U.S. Cl. ...................... 348/403; 348/420; 358/427
[58] Field of Search ................................... 348/384, 405, 348/419, 390, 400, 403, 404, 420; 382/246, 251; 358/261.1, 261.2, 261.3, 427, 433

[56] References Cited

U.S. PATENT DOCUMENTS

| | | | |
|---|---|---|---|
| 4,984,076 | 1/1991 | Watanabe et al. | 348/405 |
| 5,187,755 | 2/1993 | Aragaki | 358/133 |
| 5,197,087 | 3/1993 | Iwahashi et al. | 358/433 |

OTHER PUBLICATIONS

"Image Data Coding Algorithm II—Transform Coding–," The Journal of the Institute of Television Engineers of Japan, vol. 43, No. 10, 1989, pp. 1145–1153.

"Digital Image Processing", William K. Pratt, A Wiley–Interscience Publication, 1978, pp. 622–699.

"A Method for the Construction of Minimum–Redundancy Codes," David A. Huffman, IEEE vol. 40, Sep. 1952, pp. 1098–1101.

"Digital Compression and Coding of Continuous–Tone Still Images, Part I: Requirements and Guidelines," International Standard DIS 10918–1, Jan. 1991.

*Primary Examiner*—Tommy P. Chin
*Assistant Examiner*—A. Au
*Attorney, Agent, or Firm*—Finnegan, Henderson, Farabow, Garrett & Dunner

[57] ABSTRACT

An image signal is divided into pixel blocks, each of which is subjected to orthogonal transform to be converted to transform coefficients. The transform coefficients are divided by respective thresholds set as a quantization matrix to become quantized coefficients. Coding symbols are constructed from the quantized coefficients using a coding symbol table which includes additional coding symbols corresponding to adaptive coding operations. The coding symbols are entropy-coded to become coded information. One of the adaptive coding operations is effected in accordance with identification information that is produced in accordance with a statistical parameter of the pixel blocks. The transform and quantizing operations are stopped during a block run, and after the end of the block run a coding symbol corresponding to the block-run detection is coded. The quantization matrix is switched in accordance with variance of pixel values of the pixel block, and a coding symbol corresponding to the switching of the quantization matrix is coded.

4 Claims, 10 Drawing Sheets

$$\begin{vmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{vmatrix}$$

| GROUP NUMBER (CODING SYMBOL) | DIFFERENCE BETWEEN D.C. COMPONENTS | NUMBER OF ADDITIONAL BITS |
|---|---|---|
| 0 | 0 | 0 |
| 1 | -1, 1 | 1 |
| 2 | -3, -2, 2, 3 | 2 |
| 3 | -7···-4, 4,··7 | 3 |
| 4 | -15···-8, 8··15 | 4 |
| 5 | -31···-16, 16··31 | 5 |
| 6 | -63···-32, 32··63 | 6 |
| 7 | -127···-64, 64··127 | 7 |
| 8 | -255···-128, 128··255 | 8 |
| 9 | -511···-256, 256··511 | 9 |
| 10 | -1023···-512, 512,··1023 | 10 |
| 11 | -2047···-1024, 1024··2047 | 11 |
| 12 | -4095···-2048, 2048··4095 | 12 |
| 13 | -8091···-4096, 4096··8091 | 13 |
| 14 | -16383···-8092, 8092··16383 | 14 |
| 15 | -32767···-16384, 16384··32767 | 15 |

FIG. 6

| RUN \ SIZE | 0 | 1 | 2 | 3 | 4 | 5 | .... | 15 |
|---|---|---|---|---|---|---|---|---|
| 0 | 0 | 1 | 2 | 3 | 4 | ...... | | |
| 1 | 16 | 17 | 18 | 19 | ...... | | | |
| 2 | 32 | | | | | | | |
| ⋮ | | | | CODING SYMBOLS DETERMINED BY A COMBINATION OF NNNN AND SSSS | | | | |
| 15 | 240 | ...... | | | | | | 255 |

NNNN (rows), SSSS (columns)

FIG. 9

| GROUP NUMBER (CODING SYMBOL) | DIFFERENCE BETWEEN D.C. COMPONENTS | NUMBER OF ADDITIONAL BITS |
|---|---|---|
| 0 | 0 | 0 |
| 1 | -1, 1 | 1 |
| 2 | -3, -2, 2, 3 | 2 |
| 3 | -7···-4, 4,···7 | 3 |
| 4 | -15···-8, 8··15 | 4 |
| 5 | -31···-16, 16··31 | 5 |
| 6 | -63···-32, 32··63 | 6 |
| 7 | -127···-64, 64··127 | 7 |
| 8 | -255···-128, 128··255 | 8 |
| 9 | -511···-256, 256··511 | 9 |
| 10 | -1023···-512, 512,··1023 | 10 |
| 11 | -2047···-1024, 1024··2047 | 11 |
| 12 | BLOCK-RUN OCCURRENCE | 12 |
| 13 | QUANTIZATION CHARACTERISTIC SWITCHING 0 | 0 |
| 14 | QUANTIZATION CHARACTERISTIC SWITCHING 1 | 0 |
| 15 | QUANTIZATION CHARACTERISTIC SWITCHING 2 | 0 |

CODING DEVICE AND DECODING DEVICE ADAPTIVE TO LOCAL CHARACTERISTICS OF AN IMAGE SIGNAL

This application is a continuation of application Ser. No. 08/059,533 filed May 12, 1993, now abandoned.

BACKGROUND OF THE INVENTION

The present invention relates to a coding device and a decoding device of an image signal.

In dealing with an image having gradations, it is a general procedure to code image information to reduce its information quantity, because direct digitization of image information will produce an excessively large quantity of information.

There exist various techniques of coding an image signal. Among those, typical techniques of coding an image having gradations include transform coding techniques such as Hideo Hashimoto, "Image Data Coding Algorithm II -Transform Coding-," The Journal of the Institute of Television Engineers of Japan, Vol. 43, No. 10, 1989, pp. 1,145–1,152 and William K. Pratt, "Digital Image Processing," A Wiley-Interscience Publication.

It is known that in general, image signals have such a tendency that adjacent pixels take similar values, which means that image signals have high correlation. That is, on the frequency axis, the signal power of a high-correlation signal is concentrated on particular frequency components. Therefore, it is possible to reduce the information quantity as a whole by coding coefficients of only those frequency components.

In the transform coding, a transform is performed on an image signal so as to produce coefficients statistically independent of each other, and the respective transform coefficients are coded with bit assignment in accordance with the deviation of the signal power (see the first paper mentioned above).

Referring to a block diagram of FIG. 13, the transform coding technique is described below.

In FIG. 13, reference numeral 301 represents a block divider for dividing an image signal 300 into pixel blocks 302; 303, an orthogonal transformer for performing an orthogonal transform on the pixel block 302 to convert it to transform coefficients 304; 305, a quantizer for quantizing the transform coefficients 304 to produce quantized coefficients 306; 307, a symbol constructor for producing coding symbols and additional information 308 from the quantized coefficients 306; 309, an encoder for entropy-coding the coding symbols to output coded information 310 which includes the additional information; 311, a quantization matrix, i.e., registered quantization thresholds; and 312, a coding symbol table in which the coding symbols are registered.

The coding process of the coding device of FIG. 13 is described below, which includes a transform process, an information reduction process, a process of constructing coding symbols, and a code assigning process.

In the transform process, a two-dimensional orthogonal transform is performed utilizing correlation in the horizontal and vertical directions of an image signal. The block divider 301 produces the pixel blocks 302 each including M pixels horizontally and N pixels vertically. The orthogonal transformer 303 performs one-dimensional orthogonal transforms in the horizontal and vertical directions independently. That is, the orthogonal transformer 303 performs a linear transform according to a predetermined equation.

In the case of an 8th-order two-dimensional orthogonal transform, the transform coefficients assume an 8×8 matrix. The top-left element of the matrix takes a value corresponding to an average luminance of the pixel block 302, and is called a d.c. component. The other elements in the matrix are called a.c. components.

The information reduction process is effected in the linear quantizer 305. That is, the linear quantizer 305 linearly quantizes the transform coefficients 304 to produce the quantized coefficients 306. The linear quantization is an operation of dividing the transform coefficients 304 by the thresholds registered as the quantization matrix 311 and rounding the divided results. The thresholds registered as the quantization matrix 311 determine characteristics of the quantization, and are set for the respective matrix elements of the coefficients 304. Since an image signal has high correlation, its signal power concentrates on lower-frequency components. Therefore, more accurate quantization can be performed by setting, as shown in an example of FIG. 3, smaller thresholds for the quantization of coefficients corresponding to the lower-frequency components. It is a general procedure that larger thresholds are set for the quantization of coefficients corresponding to the higher-frequency components, to thereby effect rough quantization.

The process of constructing coding symbols is effected in the symbol constructor 307. That is, the symbol constructor 307 produces, from the quantized coefficients 306, the coding symbols (and additional information) 308 that will be used as units of the code assigning process by the encoder 309. The relationship between the quantized coefficients 306 and the coding symbols is registered in the coding symbol table 312.

The code assigning process is effected in the encoder 309. That is, the encoder 309 produces the coded information 310 by entropy-coding the coding symbol and multiplexing the additional information thereinto.

Thus, the image information is coded according to the transform coding technique.

FIG. 14 shows a structure of a code produced by the conventional coding device. The coded information 310 is a repetition of one-block codes consisting of a pair signal consisting of a d.c.-component entropy code and d.c.-component additional information and a plurality of pair signals of an a.c.-component entropy code and a.c.-component additional information.

Referring to a block diagram of FIG. 15, a description is made of a decoding technique.

In FIG. 15, reference numeral 400 represents a decoder for entropy-decoding input coded information 310 to produce a decoding symbol and additional information 401; 402, a coefficient block constructor for constructing quantized coefficients 403 from the decoding symbol and the additional information 401; 404, a linear inverse quantizer for performing inverse quantization on the quantized coefficients 403 to produce inverse-quantized coefficients 405; 406, an inverse orthogonal transformer for performing an inverse orthogonal transform on the inverse-quantized coefficients 405 to produce a decoded image block 407; 408, an image constructor for reconstructing a decoded image signal 409 from the decoded image blocks 407; 410, a decoding symbol table in which decoding symbols are registered; and 411, a quantization matrix for setting quantization characteristic.

The decoding process is symmetrical with the coding process, and includes a decoding process (by the decoder 400), a coefficient construction process, an inverse quantization process and an inverse transform process.

In the decoding process, which is effected in the decoder 400, the decoded symbol and the additional information are reproduced from the coded information 310. The decoded symbol coincides with the coding symbol 308 in the coding process.

In the coefficient construction process, the quantized coefficients 403 are reconstructed that assumes an 8×8 matrix. The quantized coefficients 403 have the same values as the quantized coefficients 306 in the coding process.

In the inverse quantization process, which is effected in the linear inverse quantizer 404, the quantized coefficients 403 are multiplied by the respective quantization thresholds that were used in the coding process. As a result, the inverse-quantized coefficients 405 are obtained.

In the inverse transform process, which is effected in the inverse orthogonal transformer 406, the decoded image block 407 is produced from the inverse-quantized coefficients 405.

Finally, the image constructor 408 produces the decoded image signal 409 by arranging the decoded image blocks 407 in a proper order.

In the following, a discussion is made of a process of processing, by the above coding device and decoding device, image data obtained by reading a document.

It is a rare case that the entire document is filled with characters, photographs, etc. Rather, in many cases, a document A includes not only image areas such as a character area B and a photograph area C but a space D (see FIG. 16). Further, a color document sometimes includes an area E having a background of a fixed color.

The following problems will occur in processing the above type of documents by the conventional coding device and decoding device.

(1) In the space D or area E having a background of a fixed color, the same operation is redundantly repeated.

(2) Although the space D has almost no information, coded information is produced. For example, even where a pixel block is "flat" and all the energy of coefficients after the orthogonal transform is concentrated on the d.c. component, it is still necessary to code a group number of the d.c. component and an EOB (end of block) code indicating the end of the coded information of each block, which will lower the coding efficiency.

(3) In the case of decoding coded information of the space D that has been coded according to the conventional technique, it may be the case that 1-block coefficients are produced from coded information of several bits. In this case, the inverse quantization and the inverse orthogonal transform are performed on all the coefficients though a large part of a.c. coefficients are zero. This is not suitable for high-speed processing.

(4) In a document including both of the character area B and the photograph area C (see FIG. 16), the pixel value varies gently in the photograph area C but varies quickly in the character area B; that is, there occurs a local variation of a statistical characteristic. Also in this respect, since the conventional technique cannot adapt to the local variation of a statistical characteristic in an image signal, it is difficult to increase the coding efficiency without reducing the image quality.

SUMMARY OF THE INVENTION

The present invention has been made in consideration of the above problems in the art, and therefore, an object of the invention is to improve the coding efficiency by removing the redundancy in coding a document having a large space, a color document having an area of a fixed color, and a document in which a statistical characteristic varies from one area to another. Another object of the invention is to increase the processing speed of a decoding process.

According to the invention, a coding device of an image signal comprises:

means for dividing the image signal into pixel blocks;

transform means for performing an orthogonal transform on each of the pixel blocks to produce transform coefficients;

quantizing means for producing quantized coefficients by dividing the transform coefficients by respective thresholds set as a quantization matrix;

means for constructing coding symbols from the quantized coefficients while referring to a coding symbol table;

means for entropy-coding the coding symbols to produce coded information;

analyzing means for calculating a statistical parameter of the pixel blocks to produce identification information indicating one of adaptive coding operations in accordance with the calculated statistical parameter; and means for controlling the coding device so as to effect the adaptive coding operation indicated by the identification information;

wherein the coding symbol table includes additional coding symbols corresponding to the respective adaptive coding operations.

According to the invention, a decoding device for decoding coded information of an image signal comprises:

means for entropy-decoding the coded information to produce decoded symbol;

means for constructing quantized coefficients from the decoded symbols while referring to a decoding symbol table having decoding symbols, and for judging whether the decoded symbol coincides with one of part of the decoding symbols corresponding to adaptive decoding operations to produce identification information indicating an adaptive decoding operation to be effected;

inverse-quantizing means for producing inverse-quantized coefficients by multiplying the quantized coefficients by respective thresholds set as a quantization matrix;

inverse transform means for performing an inverse orthogonal transform on the inverse-quantized coefficients to produce a decoded pixel block;

means for constructing an image signal from the decoded pixel blocks; and means for controlling the decoding device so as to effect the adaptive decoding operation indicated by the identification information.

BRIEF DESCRIPTION OF THE DRAWINGS

FIG. 6 shows a coding symbol table for an a.c. component;

FIG. 9 shows coding symbols and additional information for a d.c. component including those for adaptive operations;

DESCRIPTION OF THE PREFERRED EMBODIMENTS

Figure 1:
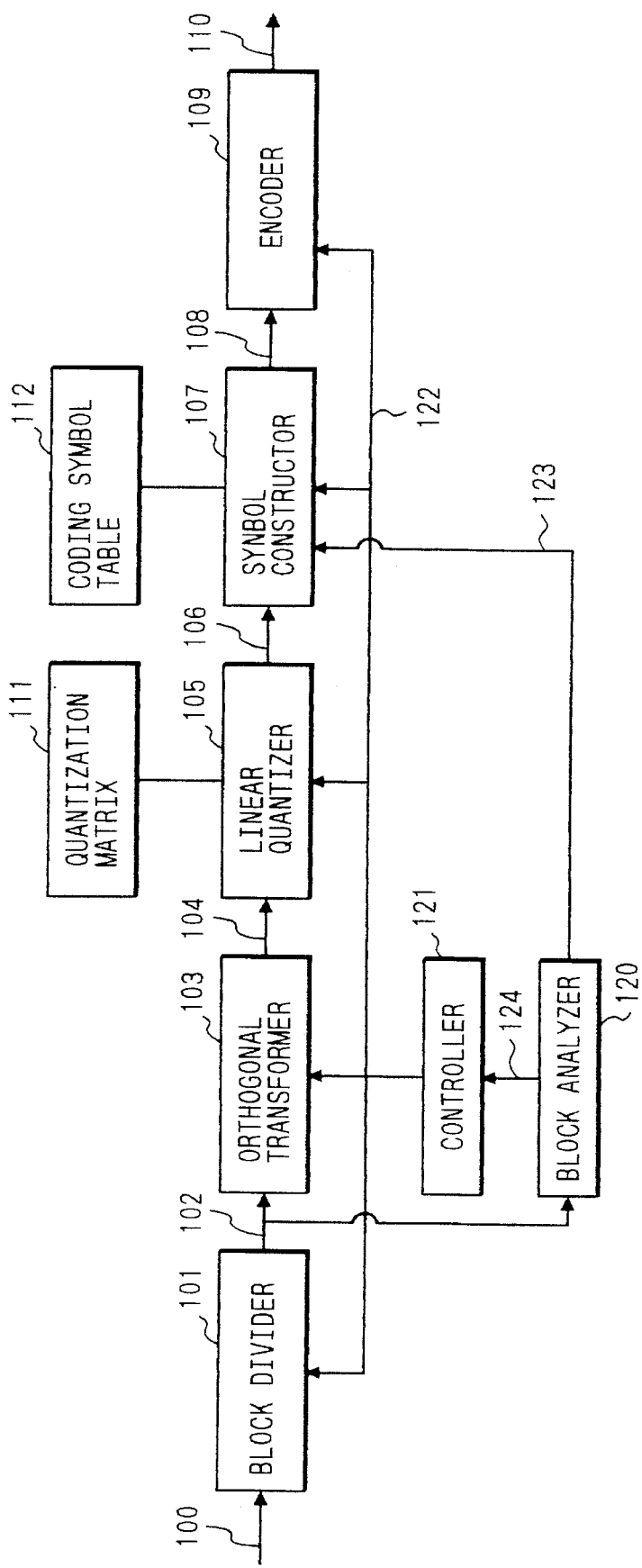
FIG. 1 is a block diagram showing a coding device according to an embodiment of the present invention.

FIG. 1 is a block diagram showing a coding device according to an embodiment of the present invention.

In FIG. 1, reference numeral 101 represents a block divider for dividing an image signal 100 into pixel blocks 102; 103, an orthogonal transformer for performing an orthogonal transform on the pixel block 102 to convert it to transform coefficients 104; 105, a quantizer for quantizing the transform coefficients 104 to produce quantized coefficients 106; 107, a symbol constructor for producing coding symbols and additional information 108 from the quantized coefficients 106; 109, an encoder for entropy-coding the coding symbols to output coded information 110 which includes the additional information; 111, a quantization matrix, i.e., registered quantization thresholds; 112, a coding symbol table in which the coding symbols are registered; 120, a block analyzer for analyzing the pixel block 102 to produce adaptive operation information 124 and analyzed information 123; and 121, a controller 121 for producing control signals based on the adaptive operation information 124.

The coding process of the coding device of FIG. 1 is described below, which includes, like the conventional process, a transform process, an information reduction process, a process of constructing coding symbols, and a code assigning process. The coding process further includes an analyzing process and an adaptation process.

Transform Process

In the transform process, a two-dimensional orthogonal transform is performed utilizing correlation in the horizontal and vertical directions of an image signal. The block divider 101 produces the pixel blocks 102 each including M pixels horizontally and N pixels vertically. The orthogonal transformer 103 performs one-dimensional orthogonal transforms in the horizontal and vertical directions independently. That is, the orthogonal transformer 103 performs a linear transform according to equation (1):

$$Y = A_N X A_M^T \quad (1)$$

where X is the pixel block 102 of N rows and M columns, Y is the transform coefficients 104 and $A_N$ and $A_M$ are Nth-order and Mth-order orthogonal transform matrices, respectively.

Among various types of orthogonal transforms, the discrete cosine transform (hereinafter referred to as DCT) is commonly used because it is superior in coding efficiency. The 8th-order two-dimensional DCT and its inverse transform are given by equations (2) and (3), respectively:

$$Y(u,v) = \frac{C(u)C(v)}{4} \sum_{j=0}^{7} \sum_{k=0}^{7} X(j,k) \cos\frac{(2j+1)u\pi}{16} \cos\frac{(2k+1)v\pi}{16} \quad (2)$$

$$X(u,v) = \frac{1}{4} \sum_{u=0}^{7} \sum_{v=0}^{7} C(u)C(v)Y(j,k) \cos\frac{(2j+1)u\pi}{16} \cos\frac{(2k+1)v\pi}{16} \quad (3)$$

In equations (2) and (3), $$C(w) = \frac{1}{\sqrt{2}} \quad (w = 0)$$

$$C(w) = 1 \quad (w = 1, 2, \ldots, 7)$$

where w is u or v. X (j, k) represents each element of the pixel block 102 and Y(u, v) represents each element of the transform coefficients 104.

Figures 2, 3:
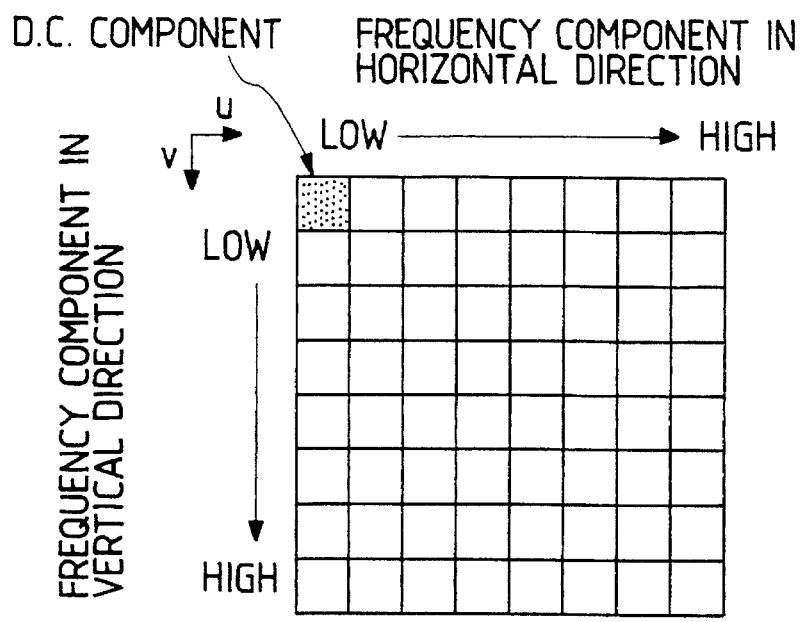
FIG. 2 illustrates a matrix of transform coefficients.
FIG. 3 illustrates an example of a quantization matrix.

FIG. 2 shows a matrix of the transform coefficients 104. The 8th-order two-dimensional orthogonal transform produces transform coefficients in the form of a 8×8 matrix. The top-left element of the matrix takes a value corresponding to an average luminance of the pixel block 102, and is called a d.c. component. The other elements of the matrix are called a.c. components.

Information Reduction Process

The information reduction process is effected in the linear quantizer 105. That is, the linear quantizer 105 linearly quantizes the transform coefficients 104 to produce the quantized coefficients 106. The linear quantization is an operation of dividing the transform coefficients 104 by the thresholds registered as the quantization matrix 111 and rounding the divided results. The thresholds registered as the quantization matrix 111 determine characteristics of the quantization, and are set for the respective matrix elements of the coefficients 101. Since an image signal has high correlation, its signal power concentrates on lower-frequency components. Therefore, more accurate quantization can be performed by setting smaller thresholds for the quantization of coefficients corresponding to the lower-frequency components. It is a general procedure that larger thresholds are set for the quantization of coefficients corresponding to the higher-frequency components, to effect rough quantization.

Coding Symbol Constructing Process

The process of constructing coding symbols is effected in the symbol constructor 107. That is, the symbol constructor 107 produces, from the quantized coefficients 106, the coding symbols (and additional information) 108 that will be used as units of the coding process by the encoder 109.

The coding symbol constructing process is described below in detail.

Figures 4, 5:
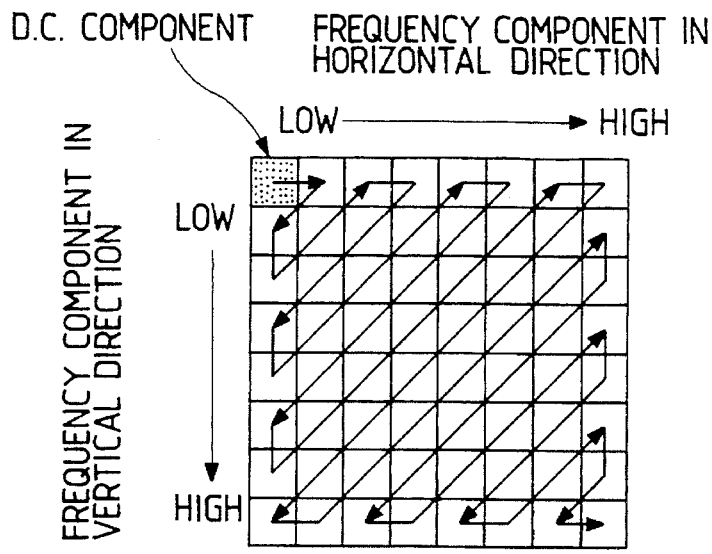
FIG. 4 illustrates quantized coefficients.
FIG. 5 shows coding symbols and additional information for a d.c. component.

FIG. 4 shows the quantized coefficients 106. As indicated by solid line arrows in FIG. 4, the quantized coefficients 106 are converted to a one-dimensional coefficient sequence by scanning the coefficient matrix in a zigzag, and the coding process proceeds in the order of this sequence.

Since the d.c. and a.c. components have different statistical characteristics, it is a general procedure that the coding symbols are constructed separately for those two types of components. The code assigning process of the next stage is also performed separately for those two types of components.

In the case of the d.c. component, first a difference between the d.c. components of the preceding block and the current block is calculated, and it is judged according to a rule of FIG. 5 which group the calculated difference belongs to. A group number is used as the coding symbol. Further, an additional bit sequence, which consists of bits of a number that is identical to the associated group number, represents which specific value within the group the calculated difference corresponds to. For example, the group of group number "2" includes four values "−3," "−2," "2" and "3," two bits of additional information is required to distinguish those numbers.

In the case of the a.c. components, during the course of the zigzag scanning of the coefficients except the d.c. component (see FIG. 4), the coding symbol is constructed as a combination of a length (zero-run length) of consecutive noneffective coefficients (zero coefficients) to an appearance of an effective coefficient (non-zero coefficient) and a group number obtained by grouping the effective coefficients in the same manner as for the d.c. component (group 0 is not used).

Where the maximum zero-run length and the maximum group number is limited to 15, a table of FIG. 6 is formed that includes 256 coding symbols. In FIG. 6, "RUN" represents the zero-run length from 0 to 15, and "SIZE" represents the group number of the value of the effective coefficient. In the occurrence of SIZE=0, it is regarded as the EOB (end of block) if RUN=0, and as a run of 16 noneffective coefficients if RUN=15 (this operation is repeated for a run of more than 16 noneffective coefficients). As in the case of the d.c. component, additional bits indicate which group the actual value of the coefficient corresponds to.

The above described relationship between the quantized coefficients and the coding symbols is registered in the coding symbol table 112.

Code Assigning Process

The code assigning process is effected in the encoder 109. That is, the encoder 109 produces the coded information 110 by entropy-coding the coding symbol and multiplexing the additional information thereinto.

The Huffmann coding technique is known as one of the entropy coding techniques, in which shorter codes are assigned to frequently-occurring symbols and longer codes are assigned to symbols of low frequency to suppress the statistical redundancy. (A. Huffmann, "A Method for the Construction of Minimum Redundancy Codes," Proc. IEEE, Vol. 40, 1952, pp. 1,098–1,101)

With the above processes, the image information can be coded according to the transform coding technique. In this embodiment, the analyzing process and the adaptation process are performed in addition to the above processes of transform, information reduction, coding symbol construction and code assigning.

Analyzing and Adaptation Processes

Figure 7:
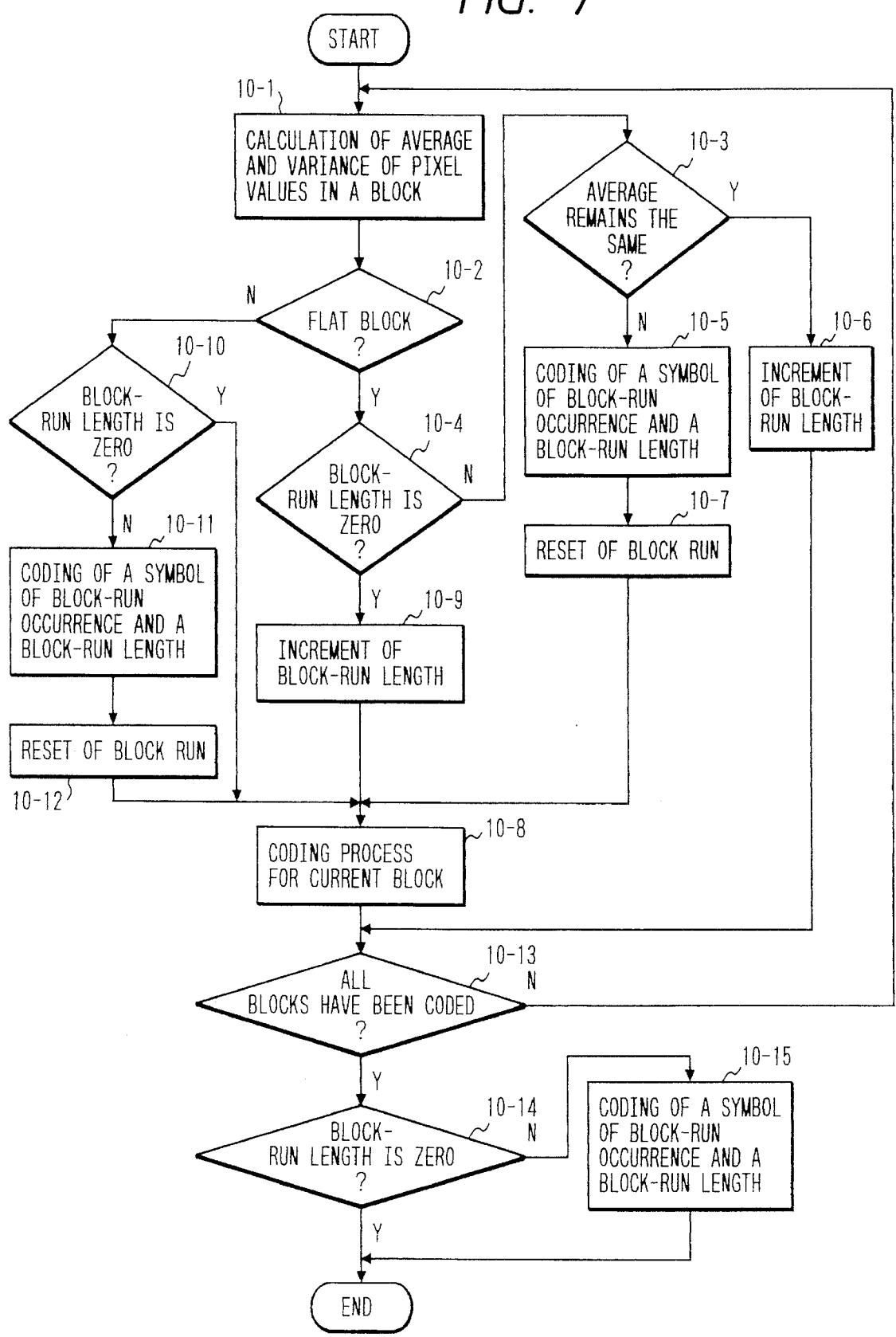
FIG. 7 is a flowchart showing an operation in connection with block-run detection.

Referring to a flowchart of FIG. 7 showing an operation in connection with block-run detection, the analyzing process and the adaptation process are described below.

The analyzing process is performed in step 10-1 where an average value and variance of pixel values in a block are calculated. The adaptation process consists of flat block detection (steps 10-2 and 10-3) based on the average and variance calculated in the analyzing process and counting of the number of consecutive flat blocks (i.e., a block-run length) (step 10-6).

The average m and variance σ of pixel values in a block are calculated as follows (step 10-1):

$$m = \Sigma x_i / L \quad (4)$$

$$\sigma = \Sigma |x_i - m| / L \quad (5)$$

where $x_i$ is a pixel value and L is the total number of pixels within the block.

If the variance Σ of a certain block is equal to or smaller than a predetermined threshold, that block is judged to be a flat block.

The block-run length continues to be counted up as long as flat blocks are consecutively detected and the average remains the same or within a predetermined variation range (steps 10-3 and 10-6).

In each block run, only the first block (where block-run length is zero) is coded according to the ordinary procedure (step 10-8), and for the subsequent blocks the coding operation is stopped and the block-run length is simply counted up (step 10-6). The increment of the block-run length is also effected for the first block (step 10-9).

If a block having a different average is detected during a block run (step 10-3), a coding symbol corresponding to the block-run detection and the block-run length represented by a predetermined number of bits are sent to the encoder 109 (step 10-5). In this case, the count of the block-run length is reset (10-7) and the ordinary coding procedure is effected (step 10-8).

If a non-flat block is detected (step 10-2) and if the block-run length is zero, the ordinary coding procedure is effected (step 10-8). If the block-run length is not zero (step 10-10), the coding symbol corresponding to the block-run detection and the block-run length represented by a predetermined number of bits are sent to the encoder 109 (step 10-11). In this case, the count of the block-run length is reset (step 10-12) and the ordinary coding procedure (step 10-8) is effected.

When all the blocks have been coded (step 10-13), it is judged whether the block-run length is zero (step 10-14). If the block-run length is zero, the process is finished. If it is not zero, the process is finished after the coding symbol corresponding to the block-run occurrence and the block-run length are coded (step 10-15).

Switching of Quantization Characteristic

Figure 8:
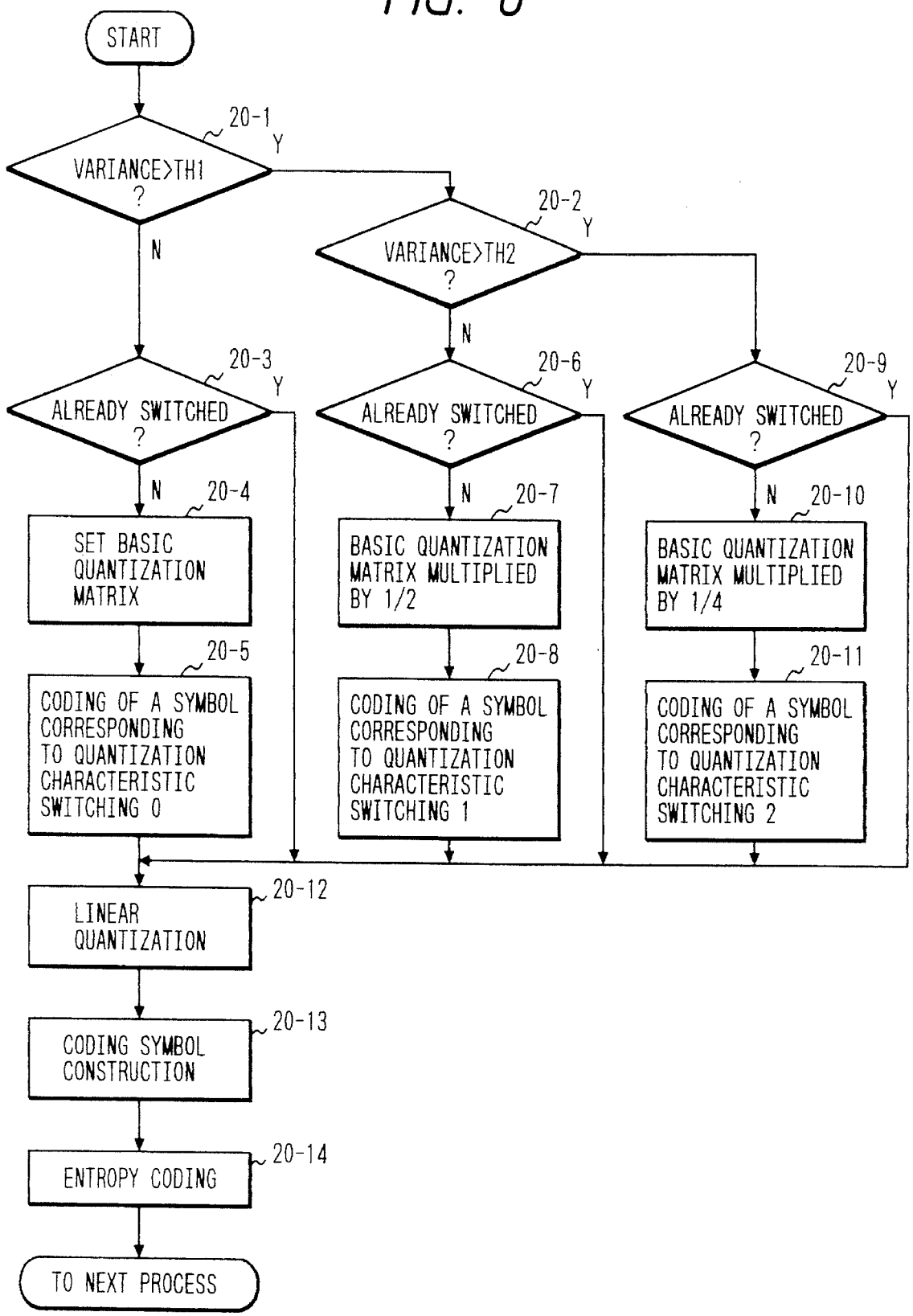
FIG. 8 is a flowchart showing an operation of switching quantization characteristics.

Referring to a flowchart of FIG. 8 showing switching of the quantization characteristic, the coding process of step 10-8 in FIG. 7 is described below.

The switching of the quantization characteristic is performed by comparing the variance g calculated by equation (5) with thresholds T1 and T2 that are set with a relationship T2>T1>0.

In the invention, the basic quantization characteristic is set in the form of a quantization matrix as shown in FIG. 3.

For a block whose variance satisfies a relationship $0 \leq \Sigma \leq T1$, the FIG. 3 matrix itself is used for the quantization (steps 20-1, 20-3 to 20-5, 20-12). For a block whose variance satisfies a relationship $T1 \leq \Sigma < T2$, an operation (i.e., scaling) of multiplying the respective elements of the FIG. 3 matrix by ½ is performed (steps 20-2, 20-6 to 20-8) and the resultant matrix is used for the linear quantization (step 20-12). For a block whose variance satisfies a relationship $T2 < \Sigma$, the respective elements of the FIG. 3 matrix are multiplied by ¼ and the resultant matrix is used for the quantization (steps 20-9 to 20-11 and 20-12).

In the occurrence of the switching of the quantization characteristic, a coding symbol corresponding to the switching is sent to the encoder 109. If the suitable quantization characteristic has already been set, the coding symbol corresponding to the switching is not sent to the encoder 109 (steps 20-3, 20-6, 20-9).

In general, in a block including an edge of a character, it is likely that the variance becomes large and high-frequency components appear in the coefficients after the orthogonal transform. By virtue of the above switching of the quantization characteristic, finer quantization compared to case of using the FIG. 3 matrix itself is performed for a block having larger variance, which will improve the image quality in the edge portions.

In the present embodiment, the switching of the quantization characteristic is performed such that one quantization matrix is prepared and the scaling is performed in accordance with the relationship between the variance and the thresholds. However, the switching of the quantization characteristic is not limited to the above one. For example, the switching may be performed such that a plurality of quantization matrices are prepared and one of those matrices is selected. Further, the number of quantization characteristics to be switched in accordance with the relationship between the variance and the thresholds is not limited to three.

Coding of Identifier of Adaptation Process

As described above, in the occurrence of an adaptive operation, the coding symbol 108 corresponding to the adaptation operation is sent to the encoder 109. As shown in FIG. 9, the coding symbols corresponding to the adaptive operations are set in the coding symbol table 112 for the d.c. component.

Where the input image signal has accuracy of 8 bits per pixel, the coefficients 104 after the DCT has accuracy of 11 bits. Therefore, the difference between the preceding d.c. component and the current d.c. component is expressed by 12-bit data, and the maximum group number of 11 is sufficient (see FIG. 9). The group numbers of the d.c. component larger than 11 can be used as the coding symbols corresponding to the particular adaptive operations.

If the common symbol table is used for both the coding and decoding processes, it becomes possible for the coding side to provide the decoding side with an instruction on the switching of a decoding operation.

In the coding symbol table of FIG. 9, group number "12" is used as a coding symbol corresponding to the block-run detection and the number of consecutive flat blocks is expressed by 12-bit data. Group numbers "13"–"15" are used as symbols corresponding to the switching of the quantization characteristic.

Figure 10:
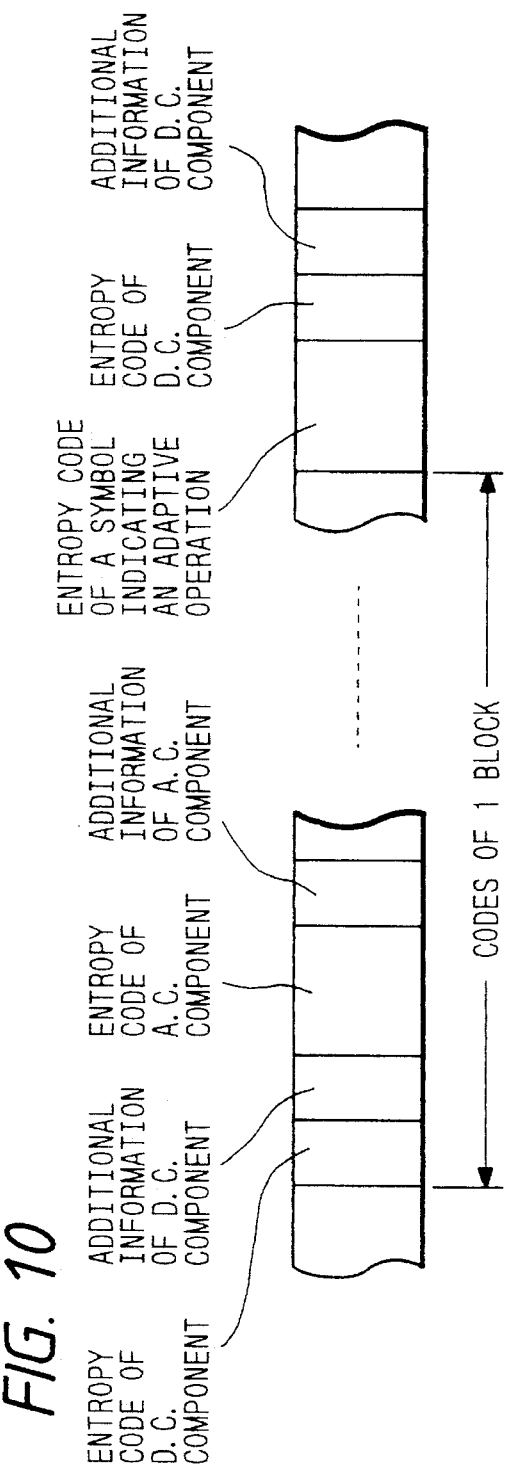
FIG. 10 shows a structure of codes produced by the coding device of the embodiment.

FIG. 10 shows a structure of codes produced by the coding device of this embodiment. The coded information 110 is a repetition of one-block codes consisting of a pair signal consisting of a d.c.-component entropy code and d.c.-component additional information and a plurality of pair signals of an a.c.-component entropy code and a.c.-component additional information. When an adaptive operation occurs, an entropy code of a symbol indicating the adaptive operation is inserted immediately before the codes of the block to be subjected to the adaptive operation.

The above-described analyzing process and the adaptation process are implemented by the block analyzer 120 and the controller 121 (see FIG. 1).

The block analyzer 120 calculates the average and variance of pixel values in the pixel block 102. By comparing the average and variance with the thresholds, the block analyzer 120 determines the run length of flat blocks and switches the quantization characteristics.

When detecting flat blocks consecutively, the block analyzer 120 provides the controller 121 with the adaptive operation information 124 indicating the block-run detection. After the first block is coded, the controller 121 stops the operation of the orthogonal transformer 103 and the linear quantizer 105.

While flat blocks are consecutively detected, the block analyzer 120 counts the number of consecutive flat blocks. When a non-flat block is detected, the block analyzer 120 sends the controller 121 the adaptive operation information 124 indicating the end of the block run. The controller 121 instructs the symbol constructor 107 to provide the encoder 109 with the coding symbol and additional information 108, i.e., the coding symbol in the coding symbol table 112 corresponding to the block-run detection and the block-run count that is output from the block analyzer 120 as the analyzed information 123.

When receiving, from the block analyzer 120, the adaptive operation information 124 indicating the switching of the quantization characteristic, the controller 121 provides the linear quantizer 105 with an instruction on the scaling. In response, the linear quantizer 105 performs scaling on the quantization matrix 111 for subsequent quantizing operations. Further, the controller 121 instructs the symbol constructor 107 to send the encoder 109 the coding symbol in the coding symbol table corresponding to the switching of the quantization characteristic.

Figure 11:
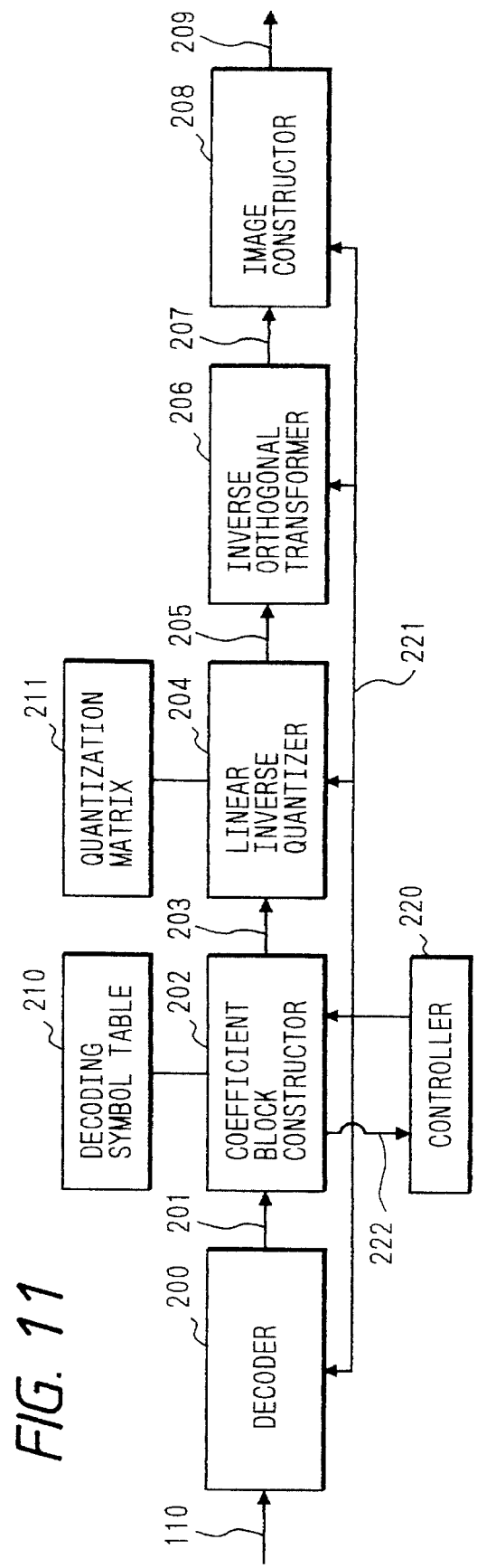
FIG. 11 is a block diagram showing a decoding device according to an embodiment of the invention.

FIG. 11 is a block diagram showing a decoding device according to an embodiment of the invention.

In FIG. 11, reference numeral 200 represents a decoder for entropy-decoding input coded information 110 to produce a decoding symbol and additional information 201; 202, a coefficient block constructor for constructing quantized coefficients 203 from the decoding symbol and the additional information 201; 204, a linear inverse quantizer for performing inverse quantization on the quantized coefficients 203 to produce inverse-quantized coefficients 205; 206, an inverse orthogonal transformer for performing an inverse orthogonal transform on the inverse-quantized coefficients 205 to produce a decoded image block 207; 208, an image constructor for reconstructing a decoded image signal 209 from the decoded image blocks 207; 210, a decoding symbol table in which decoding symbols are registered; 211, a quantization matrix as registered quantization thresholds; 220, a controller for producing, in accordance with adaptive operation information 222, respective control signals 221 to the coefficient block constructor 202, linear inverse quantizer 204, inverse orthogonal transformer 206 and image constructor 208.

The decoding device of this embodiment performs a decoding process (by the decoder 200), a coefficient construction process, an inverse quantization process and an inverse transform process in the same manner as the conventional decoding device. In addition, it performs an adaptation process.

Decoding Process

In the decoding process, which is effected in the decoder 200, the decoded symbol and the additional information are reproduced from the coded information 110. The decoded symbol coincides with the coding symbol 108 in the coding process.

Coefficient Construction Process

In the coefficient construction process, the quantized coefficients 203 are reconstructed that assumes an 8×8 matrix. The quantized coefficients 203 have the same values as the quantized coefficients 106 in the coding process.

Inverse Quantization Process

In the inverse quantization process, which is effected in the linear inverse quantizer 204, the quantized coefficients 203 are multiplied by the respective quantization thresholds (see FIG. 3) that were used in the coding process. As a result, the inverse-quantized coefficients 205 are obtained.

Inverse Transform Process

In the inverse transform process, which is effected in the inverse orthogonal transformer 206, the decoded image block 207 is produced from the inverse-quantized coefficients 205 according to equation (3).

Finally, the image constructor 208 produces the decoded image signal 209 by arranging the decoded image blocks 207 in a proper order.

Adaptation Process

Figure 12:
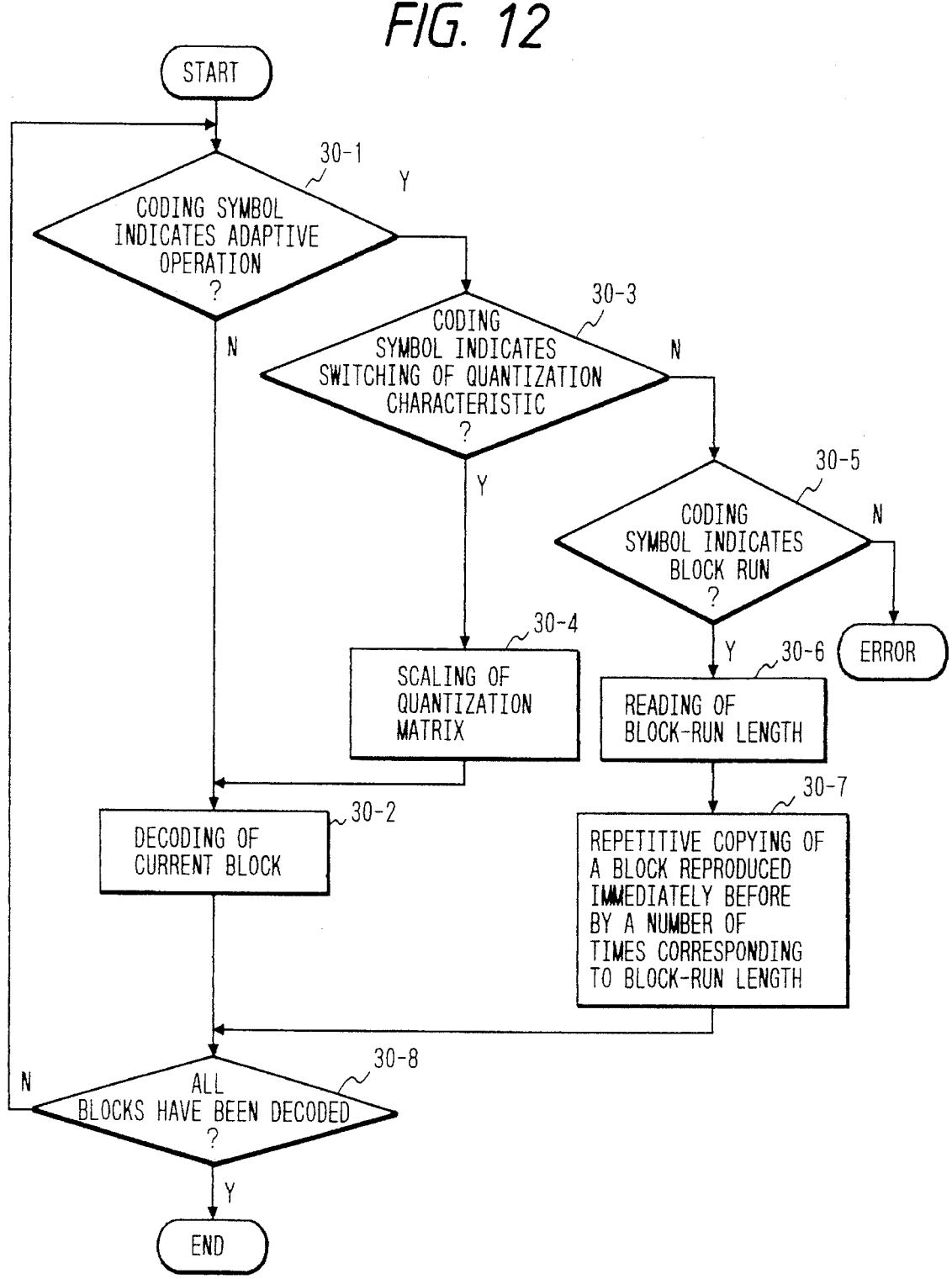
FIG. 12 is a flowchart showing an adaptation process of the decoding device.
Figure 13:
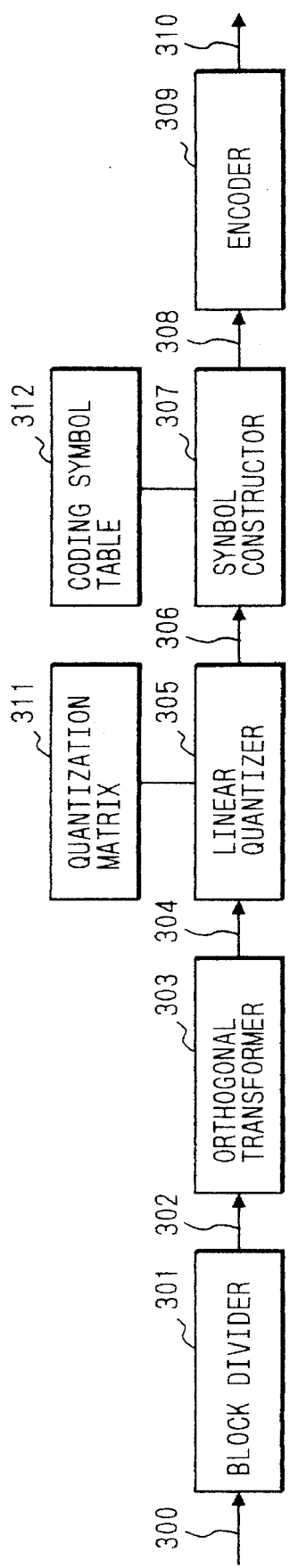
FIG. 13 is a block diagram showing a conventional coding device.
Figure 14:
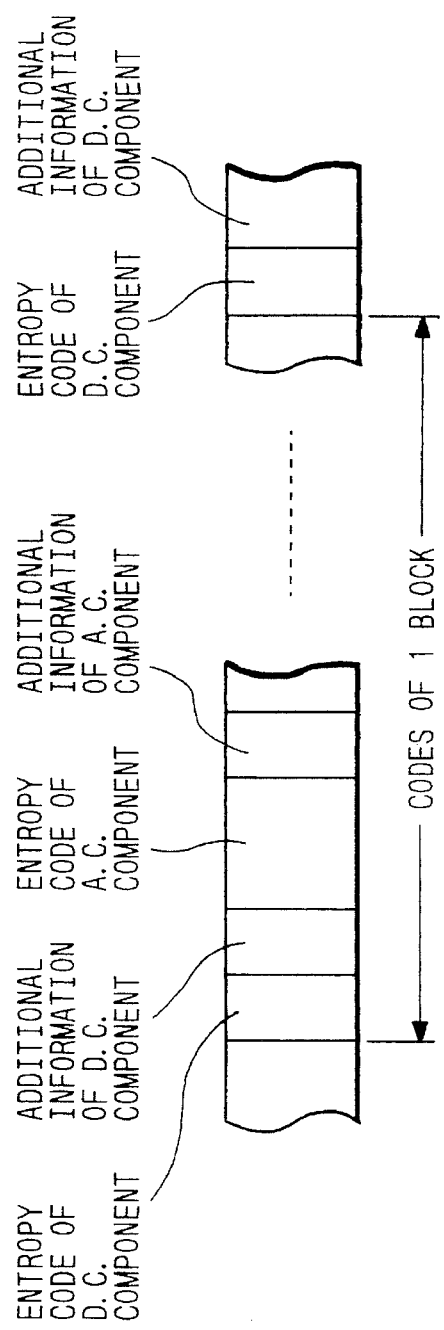
FIG. 14 shows a structure of codes produced by the conventional coding device.
Figure 15:
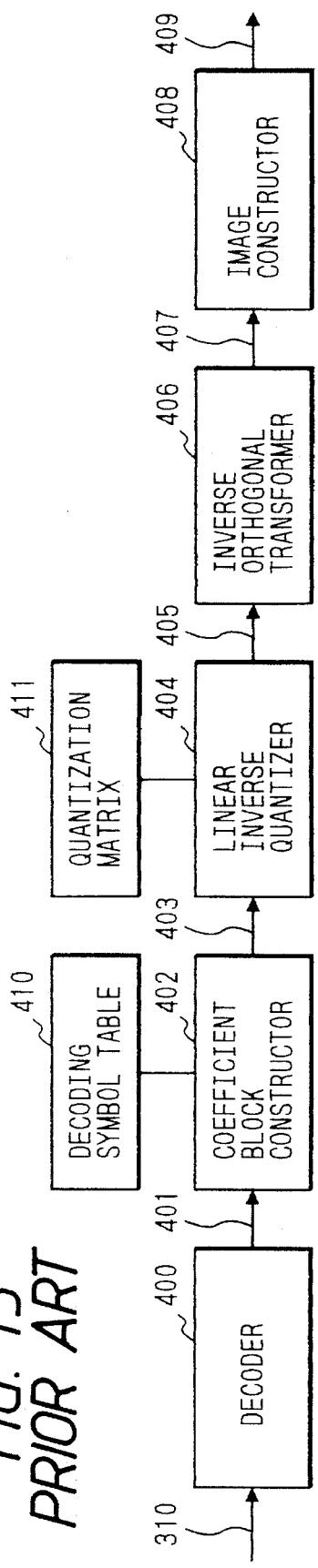
FIG. 15 is a block diagram showing a conventional decoding device.
Figure 16:
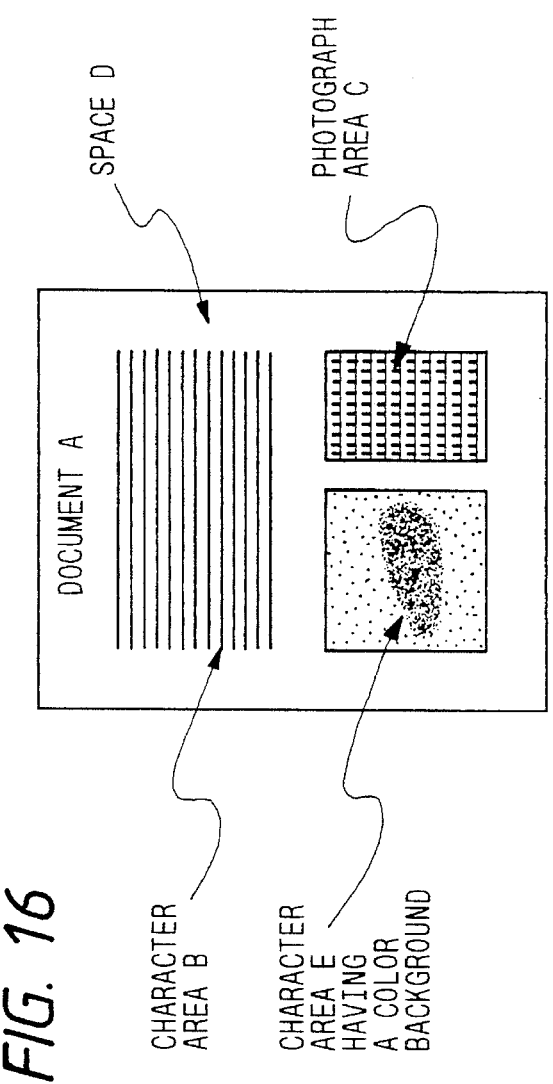
FIG. 16 is an example of a document as a subject of the coding.

FIG. 12 is a flowchart showing the adaptation process in the decoding process.

Referring to FIG. 12, the coefficient block constructor 202 compares the decoded symbol 201 produced by the decoder 200 with the coding symbols for the d.c. component that are registered in the decoding symbol table 210 (step 30-1). If the decoded symbol is one of "0"–"11," the coefficient block constructor 202 judges that a difference between d.c. components has been decoded, and performs the operation of constructing the coefficient block 203 (step 30-2). If the decoded symbol 201 is one indicating the adaptive operation on the decoding side, the coefficient block constructor 202 sends the adaptive operation information 222 to the controller 220. In accordance with the content of the information 222, the controller 220 controls the decoder 220, coefficient block constructor 202, linear inverse quantizer 204, inverse orthogonal transformer 206 and image constructor 208.

For example, if the decoded symbol corresponds to the switching of the quantization characteristic (step 30-3), the controller 220 instructs the linear inverse quantizer 204 to perform scaling on the thresholds registered as the quantization matrix 211 to change the inverse quantization characteristic for subsequent blocks (step 30-4).

When the coefficient block constructor 202 detects the symbol indicating the block-run generation (step 30-5), it reads the block-run length included in the coded information 110 (step 30-6). In accordance with the adaptive operation information 222, the controller 220 controls the image constructor 208 so that the image constructor 208 repeatedly adds, to the reproduction image, the pixel block reproduced immediately before by a number of times corresponding to the block-run length (step 30-7). The above process is repeated until all the blocks are decoded (step 30-8). While the above process is performed, the operation of the linear inverse quantizer 204 and the inverse orthogonal transformer 206 is stopped.

According to this embodiment, only the transfer of an pixel block needs to be performed while a block run continues. Therefore, the decoding device of this embodiment can provide high speed processing in contrast to the conventional technique in which the decoding is performed for every block.

As described above, by virtue of the coding process that is adaptive to local characteristics of an image, the invention can improve the coding efficiency and the image quality. Further, the invention can improve the processing speed of the decoding process.

What is claimed is:

1. A coding device for coding an image signal, comprising:

means for dividing the image signal into pixel blocks;

transform means for performing an orthogonal transform on pixel values of each of the pixel blocks to produce transform coefficients;

quantizing means for producing quantized coefficients from the transform coefficients;

first table means for defining at least a correspondence between d.c. component quantized coefficients and symbols;

second table means for defining a correspondence between a.c. component quantized coefficients and symbols;

symbol sequence construction means for constructing a sequence of symbols from the quantized coefficients with reference to the first table means and the second table means, coding symbols derived with reference to the first table means being placed at a position that is distinctive with respect to a position at which are placed coding symbols derived with reference so the second table means;

coding means for coding the sequence of symbols;

block analyzing means for determining a statistical parameter of the pixel values of each pixel block; and control means for controlling at least the symbol sequence constructing means based on the statistical parameter;

the first table means further defining a correspondence between at least one control mode of the control means and at least one symbol, said control mode being translated into the corresponding symbol by reference to the first table means, the corresponding symbol being .placed at the distinctive position in the sequence and being coded by the coding means.

2. The coding device of claim 1, wherein the control means further includes means for switching a quantizing characteristic of the quantizing means among a plurality of quantizing modes in accordance with the statistical parameter, the quantizing modes being translated into corresponding symbols by reference to the first table means, the corresponding symbols being each placed at the distinctive position in the sequence and being coded by the coding means.

3. The coding device of claim 1, wherein the distinctive position of the sequence is a leading position of the sequence.

4. The coding device of claim 1, wherein when consecutive blocks are determined to have like homogeneous image data based on the statistical parameter, a d.c. component coefficient for only a leading block of the consecutive blocks is translated into a corresponding symbol with reference to the first table means and the corresponding symbol is coded by the coding means, and a plurality of blocks following the leading block are translated with reference to the first table means into a corresponding symbol that is encoded by the coding means.

* * * * *

UNITED STATES PATENT AND TRADEMARK OFFICE
CERTIFICATE OF CORRECTION

PATENT NO. : 5,539,468
DATED : July 23, 1996
INVENTOR(S) : Kazuhiro SUZUKI et al.

It is certified that error appears in the above-indentified patent and that said Letters Patent is hereby corrected as shown below:

Claim 1, column 12, line 44, "so" should read --to--.

Claim 1, column 12, line 57, ".placed" should read --placed--.

Signed and Sealed this

Seventeenth Day of December, 1996

Attest:

BRUCE LEHMAN

*Attesting Officer*   *Commissioner of Patents and Trademarks*